United States Patent [19]
Osborne

[11] Patent Number: 5,611,924
[45] Date of Patent: Mar. 18, 1997

[54] HIGH FLOW FILTER SYSTEM

[76] Inventor: William Osborne, 2444 - 205th St., Unit 4, Torrance, Calif. 90501

[21] Appl. No.: 520,639

[22] Filed: Aug. 29, 1995

[51] Int. Cl.⁶ .................................................. B01D 29/54
[52] U.S. Cl. ...................... 210/323.2; 210/330; 210/331; 210/340; 210/341
[58] Field of Search ................................ 210/323.2, 330, 210/331, 340, 341

[56] References Cited

U.S. PATENT DOCUMENTS

| | | |
|---|---|---|
| 1,404,667 | 1/1922 | Stevens . |
| 2,754,005 | 7/1956 | Tursky . |
| 2,811,220 | 10/1957 | Winslow . |
| 3,224,587 | 12/1965 | Schmidt et al. ............... 210/330 |
| 3,362,535 | 1/1968 | Kasten . |
| 3,491,887 | 1/1970 | Maestrelli ..................... 210/330 |
| 4,043,917 | 8/1977 | Rowley et al. . |
| 4,560,483 | 12/1985 | Warning et al. . |
| 4,622,137 | 11/1986 | Kessler ....................... 210/323.2 |
| 5,008,008 | 4/1991 | Lockshaw ..................... 210/323.2 |
| 5,030,347 | 7/1991 | Drori .......................... 210/331 |
| 5,096,583 | 3/1992 | Roux et al. . |
| 5,192,430 | 3/1993 | Mohr . |
| 5,286,381 | 2/1994 | Buttery et al. .................. 210/341 |

FOREIGN PATENT DOCUMENTS

| | | |
|---|---|---|
| 492627 | 7/1992 | European Pat. Off. . |
| 654265 | 3/1979 | U.S.S.R. . |
| 1329799 | 8/1987 | U.S.S.R. . |

Primary Examiner—W. L. Walker
Attorney, Agent, or Firm—Freilich Hornbaker Rosen

[57] ABSTRACT

A high flow filter system uses readily available filters of moderate capacity to provide a high capacity flow in a reliable and easily maintained structure. The system includes a pressure vessel (20, FIG. 2) with inlet and outlet ports (16, 42), and an outlet conduit structure (68) which holds multiple moderate capacity filters (50). The filters are exposed to the inside of the vessel, and pressured fluid in the vessel flows through the filters with the filtered fluid flowing into center conduits (54) that extend vertically through a central passage of each filter. In one system, the filtered fluid flows through the lower end of each center conduit, through radial conduits (60, 61) and a manifold or spider hub part (62) to a pipe (44) that extends through the vessel outlet port. In another system, the lower ends of the center conduits are connected through holes of a manifold plate, to a manifold region. A plurality of fittings (64) are each connected to the top of a central conduit with each fitting having an upper end received in a stabilizer (70).

11 Claims, 5 Drawing Sheets

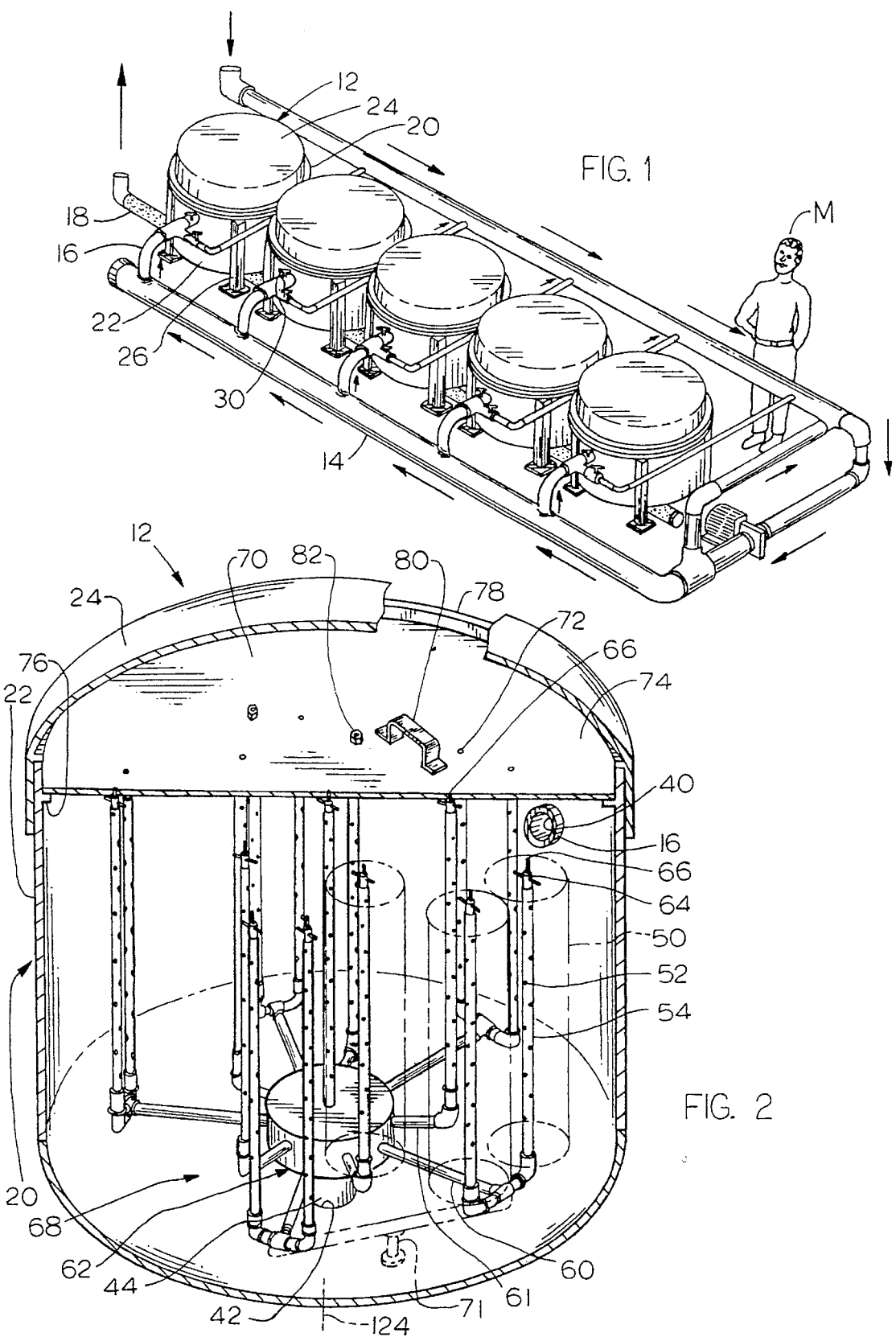

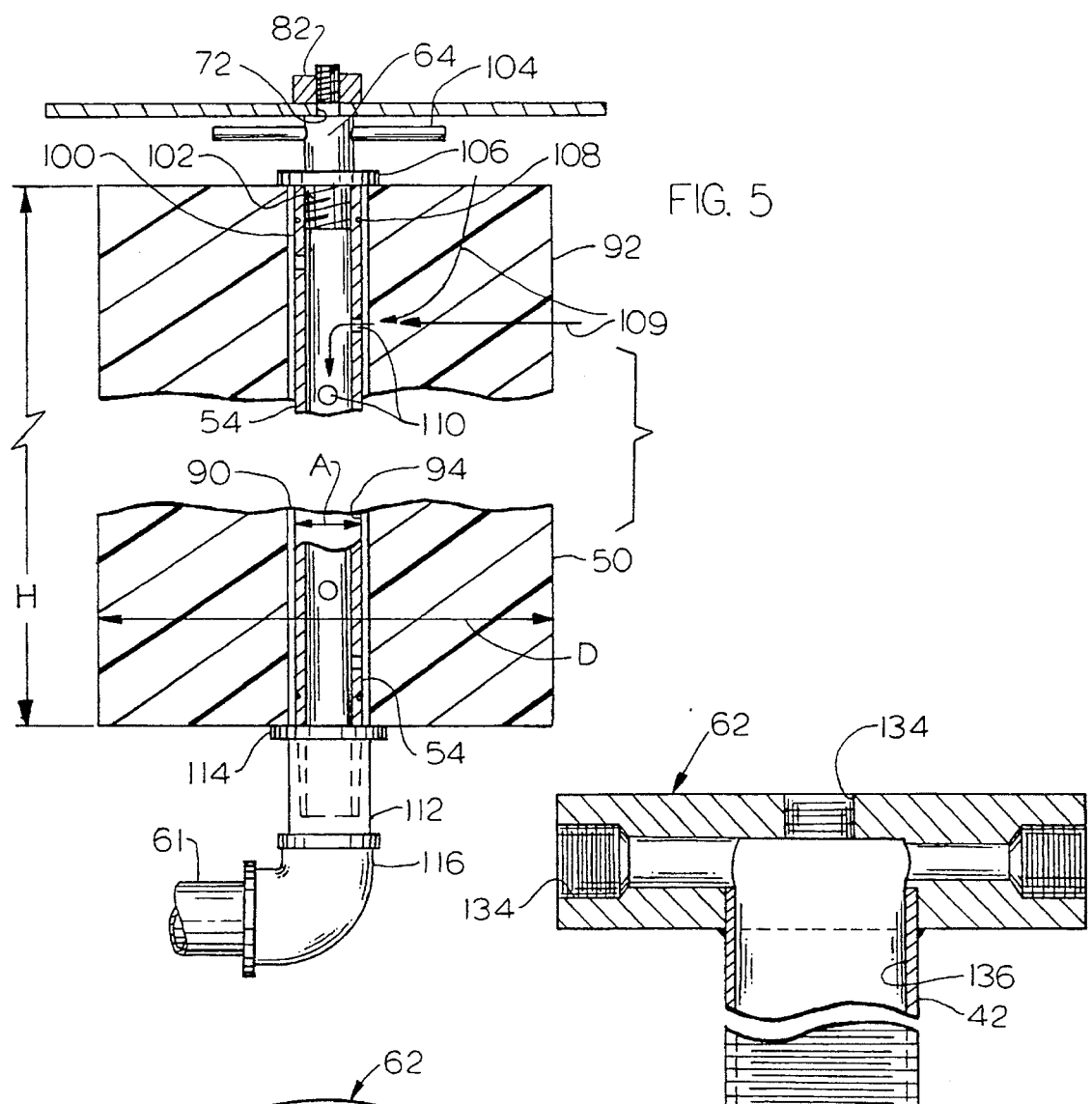
FIG. 5
FIG. 7
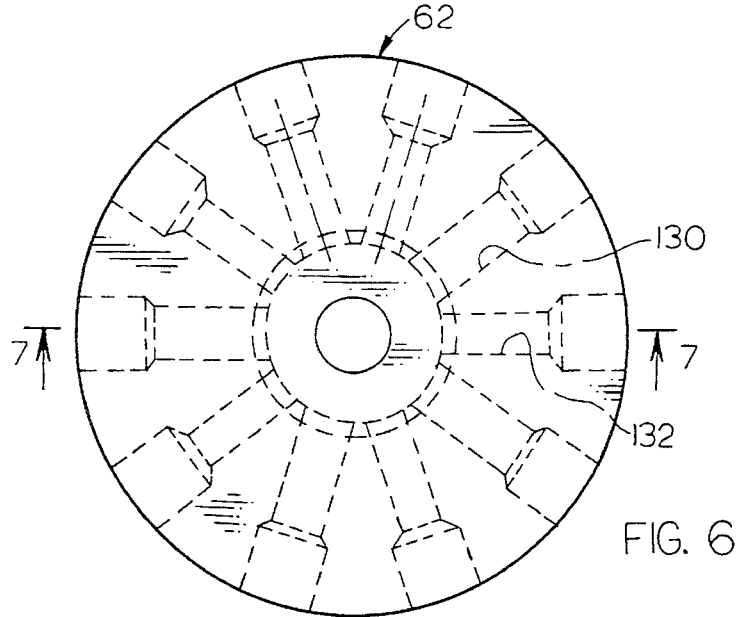
FIG. 6

HIGH FLOW FILTER SYSTEM

BACKGROUND OF THE INVENTION

A common type of filter system for removing a small amount of contaminants (usually less than one-percent by volume) from otherwise pure liquid, employs a disposable filter having a long cardboard tube at the filter center. A long sheet of filter material is wound in a tight spiral around the cardboard tube, to form an elongated cylindrical filter with a central passage. Such filters are commonly used to filter oil in vehicles, where a filter lies in a small pressure chamber containing a single filter, with oil pumped into the chamber and with oil passing through the filter then passing out through an outlet pipe to be reused. High efficiency and low cost filters are available in a range of sizes for vehicles such as trucks. The largest commonly available filter of this type is rated for 5 gpm (gallons per minute, for fluid of very low viscosity). Very good filters of this type block contaminants of a size less than 0.5 microns. Contaminants build up in the filter, until it is disposed of.

There are applications which require a much higher flow rate than 5 gpm, such as the oil systems of larger vessels, small community water purification systems, etc. Large filters having a capacity a plurality of times greater than 5 gpm are available for special applications. However, such large filters are much more expensive per unit capacity than the commonly available filters for vehicle oil systems, and these larger filters are not as efficient as the better vehicle oil filters. It would be possible to use a large number of vehicle oil filter systems connected in parallel, so the low cost and highly efficient 5 gpm filters could be used. However, the cost for a large number of pressure vessels is high, maintenance costs would be relatively high because of the need to open each of many pressure vessels to replace the filters, and the possibility of fluid leakage would increase because of the numerous vessels and connections to each of them. A high capacity liquid filter system which could use readily available low cost and efficient filters, and which had a low possibility of fluid leakage while being maintainable at moderate cost, would be of value.

SUMMARY OF THE INVENTION

In accordance with one embodiment of the present invention, a high flow filter system is provided of the type wherein fluid with less than a few percent of impurities passes through a disposable filter which retains the impurities, is provided, which can be purchased and maintained at moderate cost and which minimizes the possibility of leakage. The system includes a pressure vessel with inlet and outlet ports and a plurality of filters that are mounted on an outlet structure lying within the vessel. One outlet structure includes a single outlet pipe extending through the vessel outlet port, a manifold or spider hub leading to the outlet pipe, a plurality of radial conduits extending substantially radially from the spider hub, and a plurality of center conduits extending upwardly from radially outer ends of the radial conduits. A plurality of disposable filters are mounted so a vertical central conduit extends through the central passage of each filter. Each central conduit has a plurality of holes which receive fluid that has passed through the filter material of the filter, the central conduit carrying the filtered fluid down and radially inwardly along the radial conduits to the spider hub, which collects the fluid and passes it all through the single outlet conduit. The system avoids the need for an inlet manifold, while providing an outlet manifold structure (by the spider hub, radial conduits, and central conduits) that lies entirely within the pressure vessel. As a result, leakage of filtered fluid into the environment occurs only in joints along the single outlet pipe.

Another outlet structure includes the vertical center conduits lying within each filter, but with the lower end of each center conduit mounted on a horizontal manifold plate. The space under the manifold plate and above the vessel bottom, forms a manifold region which receives filtered fluid from all center conduits and which carries the collected filtered fluid to the single outlet pipe.

The upper end of each central conduit is sealed by a fitting which also holds down the filter and forms a seal around the top of the filter central passage. The fitting has an upstanding stud which projects into a hole of a stabilizer that joins the studs of all the fittings to stabilize the top of the central conduits. The stabilizer is preferably a plate that lies on the studs. The pressure vessel can have a lower tank that forms the internal flange, with a removable cover. When the cover is removed, the flange can be lifted off, and the fittings can be removed from the top of the central conduits as by unscrewing them therefrom, to allow the filters to be replaced.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a high flow filter complex which includes a plurality of filter systems of the present invention, the drawing including a person to show the size of the complex.

FIG. 2 is a partially sectional isometric view of a high flow filter system of the complex of FIG. 1, with filters shown in phantom lines.

FIG. 5 is a partial sectional view of one filter and one central conduit, showing the way in which the central conduit is supported and stabilized.

FIG. 6 is a plan view of the spider hub part of the system of FIG 2.

FIG. 7 is a view taken on line 7—7 of FIG. 6.

DESCRIPTION OF THE PREFERRED EMBODIMENTS

Figure 3:
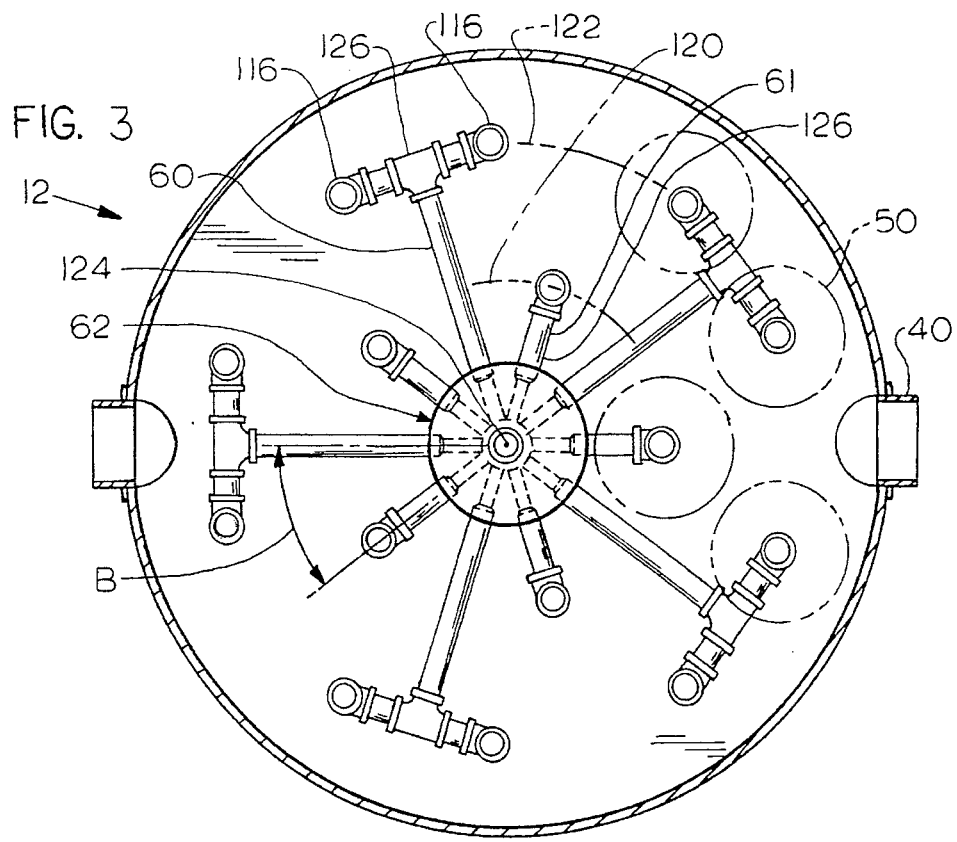
FIG. 3 is a sectional plan view of the filter system of FIG. 2.

FIG. 1 illustrates a filter complex which includes a plurality of high flow filter systems 12. A supply pipe 14 carries a large flow of fluid to be filtered, such as 400 gpm (gallons per minute) of oil that is used on a large seagoing vessel. Inlet pipes 16 carry the fluid to each of the filter systems 12 to connect them in parallel. A return pipe 18 carries filtered fluid which may, for example, resupply the lubrication system of the vessel. Each of the filter systems 12 includes a pressure vessel 20 comprising a tank 22 and a removable cover 24. The tank is supported by four columns 26 on a floor. Valves 30 along each inlet pipe 16 control flow, as to enable the shutdown of one system while replacing the filters therein.

As shown in FIG. 2, the tank 22 includes inlet and outlet ports 40, 42, with the inlet pipe 16 extending at least partially through the inlet port 40, and with an outlet pipe 44 extending through the outlet port 42. A plurality of filters 50 lie within the pressure vessel. Fluid that has passed through a filter, passes through holes 52 in a center conduit 54. The filtered fluid moves down along the center conduit and then flows along a radial conduit 60 or 61 to a manifold part or spider hub 62. Fluid from each of sixteen filters flows to the spider hub or spider hub part 62 which collects the fluid. The collected fluid flows out through the exit pipe 44. The central conduits 54, radial conduits 60, 61, spider hub 62 and outlet pipe, together form an outlet structure 68. Lower supports 71 support the longer radial conduits on the bottom of the tank.

A fitting 64 lies at the top of each center conduit 54. Each fitting has an upwardly projecting stud 66. A stabilizer 70 in the form of a plate, has sixteen holes 72. Each stud 66 projects at least partially through one of the holes 72. The stabilizer thereby supports the studs to thereby support the upper ends of the central conduits 54 to stabilize their positions so they do not tend to "fall over."

The stabilizer 70 has a peripheral portion 74 which is supported on an internal flange 76 near the top of the tank 22. When the detachable cover 24 is removed to reveal the open top 78 of the tank, handles 80 on the stabilizer can be lifted to remove the stabilizer. Applicant prefers to provide threaded studs on at least a few of the fittings, and to provide a nut 82 that screws onto the stud to hold down the stabilizer against lift off in the event of severe vibrations. When the stabilizer has been lifted, each of the fittings 64 can be removed, and each of the sixteen filters 50 can be replaced. With the fittings 64, stabilizer 70 and cover 24 replaced, the system is ready to resume operation. Several bolts (not shown) are provided to hold down the cover, and one or more elastomeric seals (not shown) seal the cover to the tank.

FIG. 5 shows some details of each filter 50, central conduit 54 and fitting 64. The filter 50 includes a porous tube 90 such as one of cardboard, and filter material 92 that may be formed by wrapping a long sheet of filter material around the cardboard tube 90 until the thickness of filter material has built up as shown. A common type of 5 gpm filter used in large trucks, has a diameter D of 7⅜ inch, a height H of 19½ inches, and a central passage 94 having a diameter A of about 1 inch. The center conduit 54 is designed to closely fit within the central passage 94 formed by the cardboard tube 90. The central conduit 54 has an upper end 100 which is internally threaded, while the fitting 64 has a lower end 102 which is externally threaded to thread into the top of the center conduit. The fitting 64 has a graspable part in the form of handles 104 to facilitate turning it, and the fitting is preferably turned until a flange 106 abuts the top of the filter to prevent it from moving up. A seal arrangement such as an O-ring at 108 seals the space between the top of the center conduit and the top of the cardboard tube.

When pressured fluid lies in the tank and therefore surrounds the filter 50, the fluid passes through pores of the filter material and flows as shown by arrows 109, through holes 110 in the center conduit, to flow downwardly therealong. The lower end of the center conduit is connected through a short pipe section 112 that carries a washer or flange 114 which supports the lower end of the filter. An elbow 116 connects to a radial conduit such as 61.

FIG. 3 shows that the filters 50 are spaced about a pair of circles 120, 122 that are centered on an axis 124, which is the axis of the spider hub 62 and also of the vessel. The radial conduits include short radial conduits 61 and long radial conduits 60, that each extends substantially radially from the axis 124. A T-connector 126 connects the radially outer end of each long radial conduit to a pair of elbows 116 that support different central conduits and the filters thereon. Each short conduit 61 has a radially outer end that connects to a single elbow 116, a single central conductor, and a single filter. The radially inner ends 126 of the radial conduits all connect to the spider hub 62.

Figure 4:
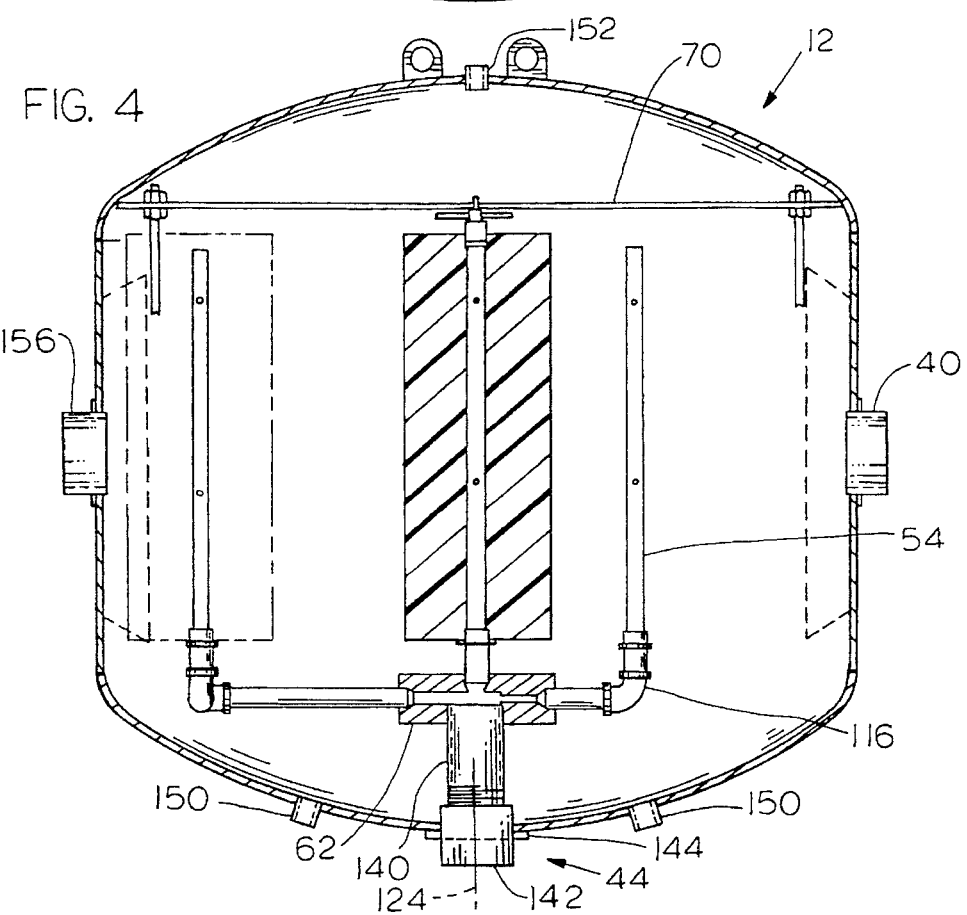
FIG. 4 is a partial sectional side view of the filter system of FIG. 3.

As shown in FIGS. 6 and 7, the spider hub 62 has ten radially extending passages, including larger passages 130 that receive filter fluid from two filters and smaller passages 132 that receive fluid from the short radial conduits that each connects to a single filter. The radially outer end of each spider passage has a thread 134 to threadably connect to a radial pipe that forms a radial conduit. It should be noted that the spider hub has a central vertically-extending passage 134 that connects to a central conduit and filter that lie on the axis of the spider hub. The spider hub has a downwardly extending outlet passage 136 of much larger diameter than the radial passages, and that forms the inside of the outlet pipe 42. As shown in FIG. 4, the outlet pipe 44 includes a spider hub portion 140 and a tank mount portion 142. The spider hub portion 140 has a threaded lower end that connects to the tank mount portion 142. The tank mount portion 142 has a flange 144 that is welded to the outside of the tank. In the event of damage to the spider hub, it can be unscrewed from the portion 142. Although the tank mount portion 142 of the outlet pipe 44 requires a joint to connect to the return pipe (18 in FIG. 1), the joint carries fluid that has been passed through sixteen filters. Several connections for each filter, which includes connections at the top and bottom of each center conduit 54, at each elbow 116, and at the eleven radial passages of the spider hub 62, are connections made within the pressure vessel. Most joint leaks allow only the very slow escape of fluid. If such a leakage allows fluid to enter the environment (where zero leakage is permissible), then added precautions are usually necessary. A leakage occurring within the pressure vessel will not have a significant effect on operation because generally there is no more than a few percent (not over 3%) of contaminants in the fluid to be filtered, and a very small amount of contaminants in the filtered fluid usually is acceptable. A breakage resulting in a large leakage flow rate is detrimental, but such leakage is rare, and such a leakage occurring within the pressure vessel will be discovered when the filters are replaced.

The pressure vessel has drainage holes 150 which are normally plugged. A vent 152 is normally plugged, but can be open to permit the escape of gas such as air from the top of the cover. An auxiliary pipe 156 is provided, which allows several filter systems 12 to be connected in series, where that is desirable, although the pipe 156 is normally plugged.

Applicant has designed a filter system 12 of the illustrated construction, using available 0.5 micron filters of a height H of 19½ inches and a diameter D of 7⅜ inches. The radial conduits were spaced apart by a substantially uniform angle B of 36°. With two central conduits 54 at the end of each long radial conduit 60, the system held sixteen filters. The pressure vessel had a diameter of about 40 inches and the top of its cover (at vent 152) lay about 50 inches above the floor, with the stabilizer 70 lying about 40 inches above the floor. This allows a workman of a height of about six feet to easily replace the filters. The vessel was designed for use at a working pressure range of 10 to 70 psi, and had a flow of 50 gpm using nominal 5 gpm filters, for a viscous oil.

Figure 8:
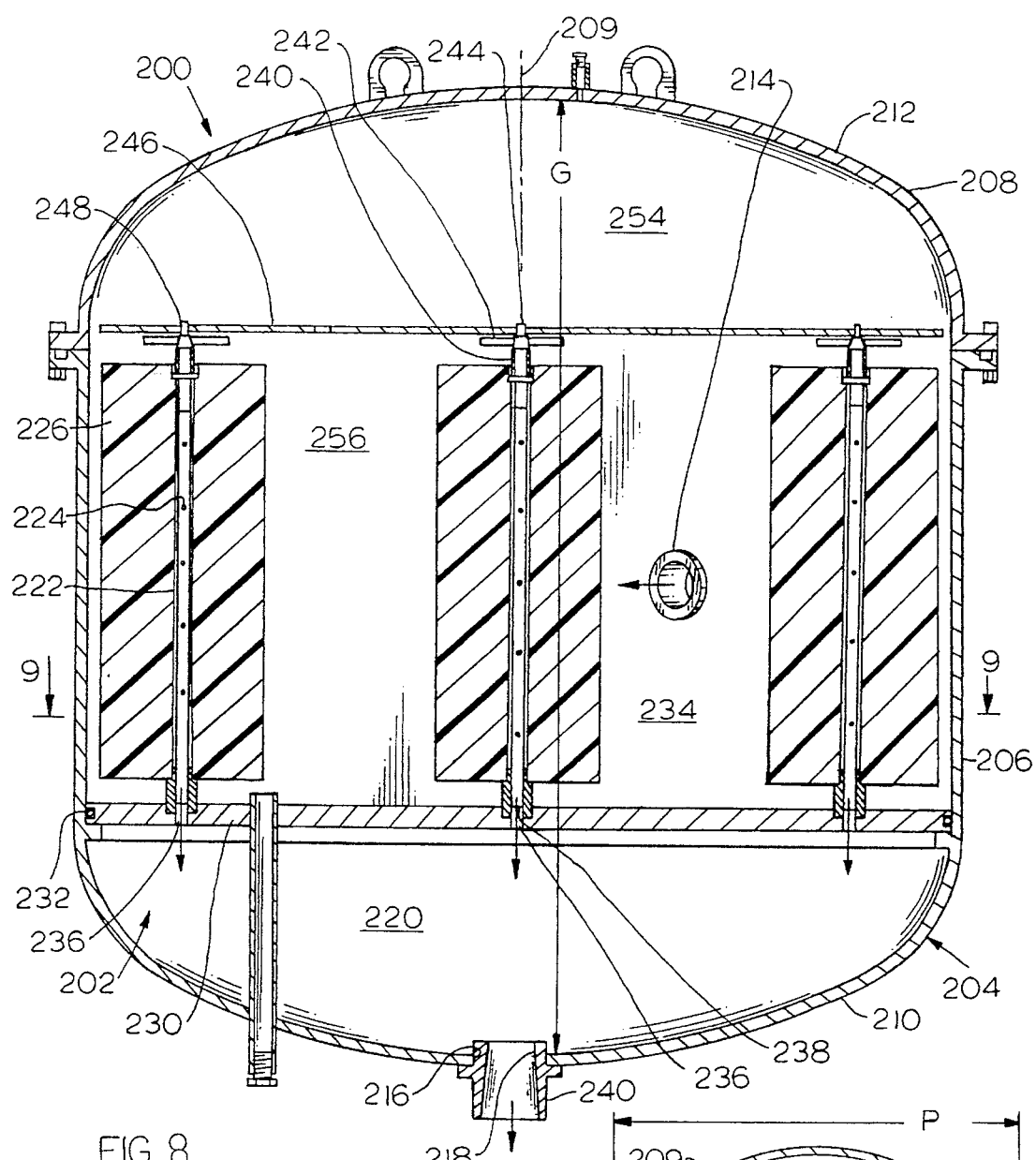
FIG. 8 is a partial sectional side view of a high flow filter system of another embodiment of the invention.

FIG. 8 illustrates another filter system 200 which has a simpler outlet structure 202. The system includes a pressure vessel 204 formed by a tank 206 and a cover 208. The vessel has an axis 209 and opposite end portions 210, 212. An inlet port 214 receives unfiltered fluid to be filtered. A diverter plate (not shown) disperses incoming oil throughout the upper portion of the vessel. An outlet port 216 has an outlet opening 218 through which filtered fluid is discharged. The vessel has a manifold region 220 lying at the lower end portion of the vessel and coupled to the outlet port.

The system includes a plurality of elongated parallel center conduits 222 that extend parallel to the axis 209, and that each have holes 224. A filter 226 of the same construction as filter 50, lies around each center conduit.

The outlet structure 202 includes a plate-like manifold member 230 that extends across the inside of the vessel. The manifold member is sealed by a seal 232 to the vessel walls, to divide the vessel into an unfiltered region 234 that receives the unfiltered fluid, and a filtered region that forms the manifold region 220 and that holds the filtered fluid. The manifold member has a plurality of through holes 236, and the center conduits have outlet portions 238 at their lower ends that are each connected to one of the through holes. Filtered fluid passing along a center conduit moves down through a hole 236 into the manifold region 220, and from there out through the outlet opening 218 of an outlet pipe 240.

Figure 9:
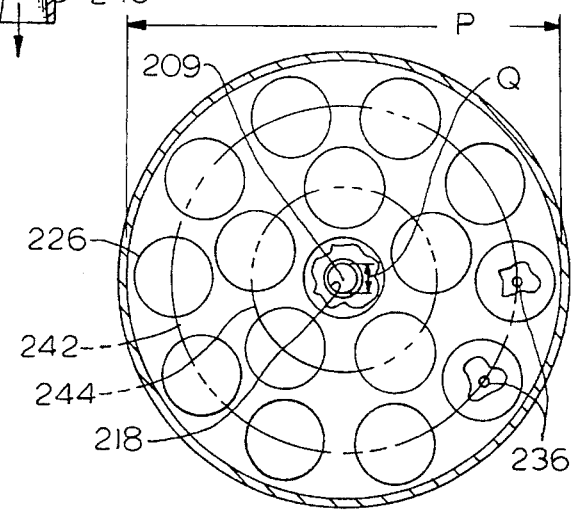
FIG. 9 is a view taken on line 9—9 of FIG. 8.

As shown in FIG. 9, the filters 226 are arranged in two concentric circles 242, 244 with a plurality of filters lying along each circle. The filters are also arranged to include a center filter at the axis 209, to provide a total of sixteen filters. The holes 236 in the manifold member are arranged along the same two circles and at the axis. The inside diameter or width P of the vessel in the manifold region 220 immediately under the manifold member 230, is many times greater than the diameter Q of the outlet opening 218. The cross-sectional area of the manifold region at P should be more than ten times the area of the outlet (or immediately downstream thereof). The large area at P is required to connect to the many central conduits that are spaced by more than each filter diameter. A much smaller area at Q is desirable because only a small cross-section is needed to handle the outflow from the many but small diameter holes 236 in the manifold member, and because a larger outlet pipe and connections thereat are more expensive and hold more oil that must be drained during maintenance.

The upper ends of the center conduits 222 (FIG. 8) carry fittings 240 with handles 242 and studs 244. A stabilizer 246 has holes 248 that receive the studs. The stabilizer is held down by nuts on the studs 244. The volume 254 above the stabilizer 246 is coupled to the volume 256 under the stabilizer by holes in the stabilizer. The two volumes can constitute the region 234. The volume 254 may be largely filled with a lightweight filler material.

In a design applicant has made for the system of FIGS. 8 and 9, the vessel has a maximum internal width P of 42 inches and a maximum internal height G of 42 inches. The outlet opening has a minimum width Q of 2 inches. The filters and central conduits are of substantially the same dimensions as for FIGS. 1–7.

Figure 10:
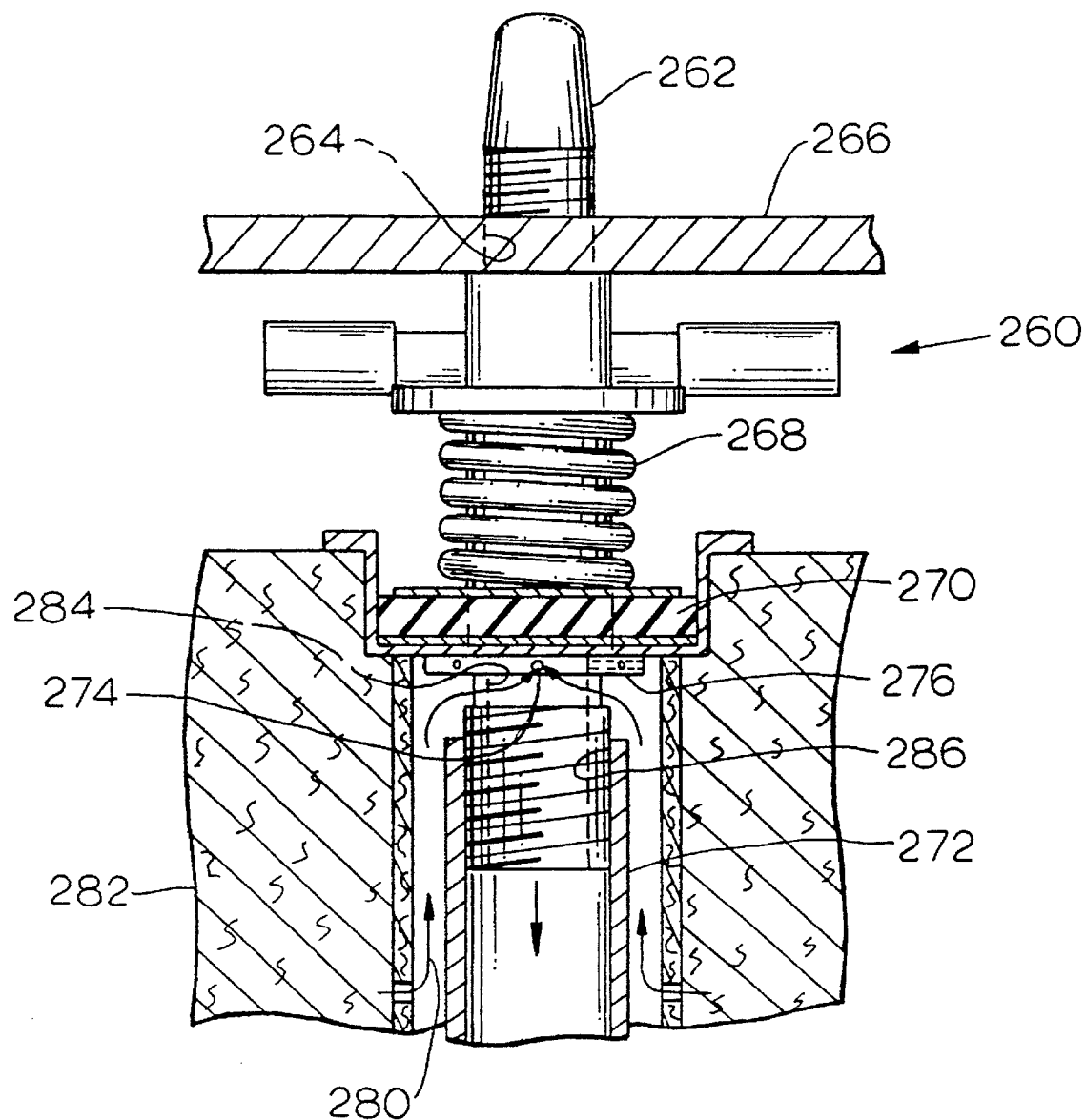
FIG 10 is a view of the upper portion of a modified fitting.

FIG. 10 illustrates the upper portion of a modified fitting 260 which has a stud 262 that projects through a hole 264 in a stabilizer 266. A spring 268 presses down a seal 270. Instead of multiple holes spaced along the length of a center conduit 272, holes 274 are provided in a flange 274 of the fitting. Filtered fluid moving along paths 280 out of the filter 282, pass into the flange 276, along a fitting passage 284, and down through a hole 286 at the top of the center conduit.

Thus, the invention provides a filter complex and high flow filter systems thereof which each efficiently uses numerous filters (preferably at least 5 to justify the outlet conduit structure) of moderate capacity to permit a large filter fluid flow rate in a relatively low cost and easily maintained system. In one system, an outlet conduit structure comprises an outlet pipe extending through an outlet port of a pressure vessel, a spider hub part or manifold connected to the outlet pipe, a plurality of radial conduits extending radially from the spider hub part, and a plurality of preferably vertically extending central conduits extending from outer ends of the radial conduits. It is possible to include the spider hub part and radial conduits in a large plate of a thickness of a few inches. Each central conduit extends along substantially the entire length of a passage in a filter. A fitting attached to the upper end of each central conduit, seals the top of the central conduit while holding down the filter. An upwardly extending stud on each fitting extends into a hole of a plate-like stabilizer whose periphery is coupled to the vessel so the vessel limits movement of the stabilizer. The radial and central conduits can be formed of pipes which enables low cost construction of the system. The filters can be readily replaced by removing the cover and stabilizer, unscrewing the fittings from the central conduits, and replacing the filters. In another system, the lower ends of the central conduits on which the filters are mounted, are mounted on a plate-like manifold member. Filtered fluid passes down from the central conduits through holes in the manifold member, to a large manifold region, and from there through a small diameter outlet.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A high flow filter system, comprising:

a pressure vessel having a vertical axis and having inlet and outlet ports, said vessel including a tank having bottom and side walls and an open top, and said vessel having a cover which is removably mounted on said tank and which covers said top;

an outlet structure which includes a manifold region lying near the bottom of said tank and having an outlet, and a plurality of elongated largely vertical center conduits having lower ends coupled to said manifold region and having upper ends, said center conduits each having at least one hole;

a plurality of disposable filters that each have a central filter passage, said filters each being mounted on one of said center conduits with each center conduit projecting through most of the length of the filter passage of a corresponding filter;

a stabilizer lying in said tank over said filters, said stabilizer having a plate portion with a plurality of plate holes;

a plurality of fittings, each having a lower end attached to the upper end of one of said center conduits and having an upper end engaged with said stabilizer plate portion, with each fitting having a stud projecting into one of said plate holes and having graspable part (104) lying below the stud and being capable of being grasped to turn it and remove said fitting lower end from said center conduit upper end when said stabilizer plate portion is removed, so after the stabilizer is removed the graspable part can be detached from the center conduit.

2. The system described in claim 1 wherein:

each of said detachable members comprises a handle.

3. The system described in claim 1 wherein:

a plurality of said studs have threaded upper ends, and including a nut screwed into each of said threaded stud upper ends to hold the stud to said stabilizer.

4. The system described in claim 1 wherein:

each of said center conduits has an open internally threaded upper end, and each of said fittings has a threaded lower end that threadably engages the upper end of a central conduit.

5. The system described in claim 1 wherein:

each of said center conduits has an open upper end that forms said at least one hole, and each of said fittings has at least one fitting hole and a fitting passage coupled to said hole and to said upper end of said center conduit.

6. A high flow filter system comprising:

a pressure vessel having an axis, inlet and outlet ports, and first and second end portions;

an outlet structure which includes a manifold region lying near said vessel first end portion and coupled to said outlet port, and a plurality of elongated parallel center conduits that each extend largely parallel to said axis and that each have at least one hole and that each has a center conduit outlet portion coupled to said manifold region;

a plurality of disposable filters that each has an elongated central filter passage, with each of said parallel center conduits being coupled to a corresponding one of said filters, so filtered fluid that has passed through a filter to the filter passage can enter a corresponding one of said parallel center conduits through said at least one hole thereof to flow therethrough to said manifold region;

each of said filters has a quantity of filter material with an outside surface open to the inside of said vessel, so pressured fluid lying in said vessel can flow directly into said filter material without requiring an input manifold;

said outlet structure includes a plate-like manifold member that extends across the inside of said vessel to divide the inside of said vessel between an unfiltered region that receives fluid to be filtered and a filtered region that forms said manifold region, said manifold member having a plurality of through holes and said center conduit outlet portions are each connected to one of said through holes to flow filtered fluid from a center conduit into said manifold region;

said center conductors and said through holes lie on a plurality of concentric circles of different diameters to thereby utilize a large portion of the volume of said pressure vessel.

7. The system described in claim 6 wherein:

said filters and said holes in said plate-like member, are arranged in two concentric circles, and are also arranged to include a center hole and a filter lying at the center of said circles.

8. A high flow filter system comprising:

a pressure vessel having inlet and outlet ports;

an outlet conduit structure which includes an outlet pipe extending through said outlet port, and a spider hub part lying within said vessel and connected to said outlet pipe, with said spider hub part having an axis and a plurality of holes;

said outlet structure also including a plurality of radial conduits extending largely radially from said spider hub part with each radial conduit including a radial pipe with a radially inner end lying in one of said holes and with a radially outer end, and a plurality of elongated parallel center conduits that each is connected to the radially outer end of one of said radial pipes and that each extends largely perpendicular to said radial conduits and parallel to said axis and that each has at least one hole;

a plurality of disposable filters that are each mounted around one of said center conduits and that each has an elongated central filter passage, with each of said parallel center conduits projecting into the filter passage of a corresponding one of said filters, and with said at least one hole of each center conduit coupled to a corresponding central passage so fluid passing through a filter to its filter passage, can enter a corresponding one of said parallel center conduits to flow therethrough;

each of said filters has a quantity of filter material with an outside surface open to the inside of said vessel, so pressured fluid lying in said vessel can flow directly into said filter material without requiring an input manifold;

said plurality of radial conduits includes first and second sets of radial conduits of different lengths that each supports one of said filters so said filters lie at different distances from said axis.

9. The system described in claim 8 wherein:

each of said radial conduits of said second set has a T at its radially outer end and carries two center conduits with each lying at a different end of the T.

10. A high flow filter system comprising:

a pressure vessel having an axis, inlet and outlet ports, and first and second end portions;

an outlet structure which includes a manifold region lying near said vessel first end portion and coupled to said outlet port, and a plurality of elongated parallel center conduits that each extend largely parallel to said axis and that each have at least one hole and that each has a center conduit outlet portion coupled to said manifold region;

a plurality of disposable filters that each has an elongated central filter passage, with each of said parallel center conduits being coupled to a corresponding one of said filters, so filtered fluid that has passed through a filter to the filter passage can enter a corresponding one of said parallel center conduits through said at least one hole thereof to flow therethrough to said manifold region;

a plurality of disposable filters that each has an elongated central filter passage, with each of said parallel center conduits being coupled to a corresponding one of said filters, so filtered fluid that has passed through a filter to the filter passage can enter a corresponding one of said parallel center conduits through said at least one hole thereof to flow therethrough to said manifold region;

a plate-like stabilizer which lies in said vessel and which has a plurality of holes;

a plurality of fittings that each has a lower end detachable mounted to the top of one of said center conduits, with a plurality of said fittings each having a part projecting into one of said holes in said stabilizer, with said stabilizer being removable by lifting it off said projecting parts, and with said stabilizer being free of attachment to said vessel so said stabilizer is held substantially only by said fittings.

11. A high flow filter system, comprising:

a pressure vessel having a vertical axis and having inlet and outlet ports;

an outlet structure which includes a manifold region with a plate-like part lying near the bottom of said vessel and having an outlet, and a plurality of elongated largely vertical center conduits having lower ends supported on said plate-like part and coupled to said manifold region and having upper ends, said center conduits each having at least one hole;

a plurality of disposable filters that each have a central filter passage, said filters each being mounted around one of said center conduits with each center conduit projecting through most of the length of the filter passage of a corresponding filter, so fluid passing into the central filter passage can flow through the at least one hole into a center conduit;

a stabilizer lying in said tank over said filters;

a plurality of fittings, each having a lower end attached to the upper end of one of a group of said center conduits and having an upper end engaged with said stabilizer, with each of said center conduits of said group providing upward force to support said stabilizer and also providing a conduit for carrying fluid downwardly into said manifold region.

* * * * *